United States Patent
Levine et al.

(10) Patent No.: US 6,783,071 B2
(45) Date of Patent: Aug. 31, 2004

(54) SCANNER PAIRING IN A BLUETOOTH POS NETWORK

(75) Inventors: Adam Levine, Huntington Station, NY (US); Stephen J. Shellhammer, Lake Grove, NY (US)

(73) Assignee: Symbol Technologies, Inc, Holtsville, NY (US)

( * ) Notice: Subject to any disclaimer, the term of this patent is extended or adjusted under 35 U.S.C. 154(b) by 0 days.

(21) Appl. No.: 09/883,516

(22) Filed: Jun. 18, 2001

(65) Prior Publication Data

US 2002/0190128 A1 Dec. 19, 2002

(51) Int. Cl.[7] ............................................. G06K 15/00
(52) U.S. Cl. ........................ 235/462.13; 235/462.45; 235/62.46; 235/462.47; 235/472.01; 235/472.02; 235/383; 235/375
(58) Field of Search ................. 235/462.13, 462.45, 235/462.46, 462.47, 472.01, 472.02, 383, 375

(56) References Cited

U.S. PATENT DOCUMENTS

| | | | | |
|---|---|---|---|---|
| 3,836,755 A | * | 9/1974 | Ehrat | 177/25.15 |
| 5,825,002 A | * | 10/1998 | Roslak | 235/375 |
| 5,995,105 A | * | 11/1999 | Reber et al. | 345/835 |
| 6,189,789 B1 | * | 2/2001 | Levine et al. | 235/383 |
| 6,199,048 B1 | * | 3/2001 | Hudetz et al. | 235/462.01 |
| 6,201,811 B1 | * | 3/2001 | Larsson et al. | 370/280 |
| 6,412,699 B1 | * | 7/2002 | Russell et al. | 235/472.01 |
| 6,424,830 B1 | * | 7/2002 | O'Hagan et al. | 455/422 |

FOREIGN PATENT DOCUMENTS

| | | | |
|---|---|---|---|
| WO | WO 98/38761 | * | 9/1998 |

* cited by examiner

Primary Examiner—Steven S. Paik
(74) Attorney, Agent, or Firm—Baker Botts L.L.P.

(57) ABSTRACT

Wireless data communications using a master/slave protocol are easily established between a master radio module which is part of a POS terminal and a slave radio module which is part of a portable bar code scanning device. A bar code identifying the portable bar code scanning device is provided on the outside of the housing of the portable device. By scanning this bar code with a scanner associated with the POS terminal, such as a fixed scanner built onto a counter, the master/slave radio communications link can be automatically implemented.

8 Claims, 1 Drawing Sheet

SCANNER PAIRING IN A BLUETOOTH POS NETWORK

BACKGROUND OF THE INVENTION

This invention relates to systems which use wireless data communications to communicate between a portable handheld device (e.g., a portable scanner, a mobile computer, etc.) and a terminal. In particular, the invention relates to point of sale (POS) systems, wherein the portable device may be used to acquire bar codes from items being purchased and to communicate the data read from the bar code to the point of sale terminal by wireless data communication.

One system for wireless data communication is the Bluetooth protocol, wherein data communication devices are operating in a master/slave relationship. The Bluetooth protocol specification is available at www.bluetooth.com. In order to establish communications, for example, between a point of sale terminal and a portable bar code scanning device, the terminal needs to be provided with the Bluetooth device address corresponding to the portable bar code reading device. Thereafter, the terminal's radio communication module can be operated as a master device and establish a master/slave relation with the radio module in the portable bar code scanning device.

It is an object of the present invention to provide a new and improved method of establishing the master/slave relation between devices.

SUMMARY OF THE INVENTION

In accordance with the present invention, there is provided an improvement in a point of sale system for acquiring bar code data relating to a transaction. The system includes a first bar code scanner which is arranged to scan bar codes and provide data relating to scanned bar codes to a processor. According to the improvement of the invention, a second portable bar code scanner is provided. The second scanner includes a radio module for acting as a slave unit using a master/slave data communications protocol and the second scanner includes an identifying bar code. There is provided a master radio module associated with the point of sale system. The master radio module is arranged to act as a master for communication with the slave radio module in response to reading of the identifying bar code on the portable scanning device.

In one embodiment the identifying bar code is representative of a data communications address for the slave radio module. Alternately, the processor may include a memory having a data communication address for the slave radio associated with data representing the identifying bar code. In a preferred arrangement, the master module is arranged to discontinue acting as a master for communication with the slave radio module in response to a further reading of the identifying bar code on the portable scanning (reading) device.

In accordance with the invention there is provided. a method for establishing a master/slave data communications link. The method comprises providing a machine readable identifying device on a slave unit. Reading the identifying device with a reader associated with the master unit to obtain identifying data. A slave address is determined from the identifying data and the master unit is operated to associate with the slave unit.

In accordance with the invention there is provided a method for reading bar codes on items to be purchased. A portable bar code reader is provided having a slave radio module with a slave address for providing data communication. The portable bar code reader also has an identifying bar code thereon. The identifying bar code is read with a second bar code reader associated with a master radio module and a data processor to obtain identifying data. The slave address is determined using the identifying data and the master unit is operated to associate with the slave unit. The portable bar code reader and the second bar code reader can be selectively used to read bar codes and provide data to the processor.

In accordance with the invention, there is provided a portable bar code scanner which includes a housing enclosing a slave radio data transceiver having an address and an optical bar code reader. A bar code is provided on the exterior of the housing, the bar code being uniquely associated with the address.

In accordance with the invention, there is provided a terminal having a processor, a bar code reader and a master radio module for providing data communications. The terminal further has a program for operating the processor. The program is arranged to operate the bar code reader and provide data to the processor to operate the processor to recognize data as data identifying a slave unit and to operate the radio module to conduct data communications with the slave unit.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
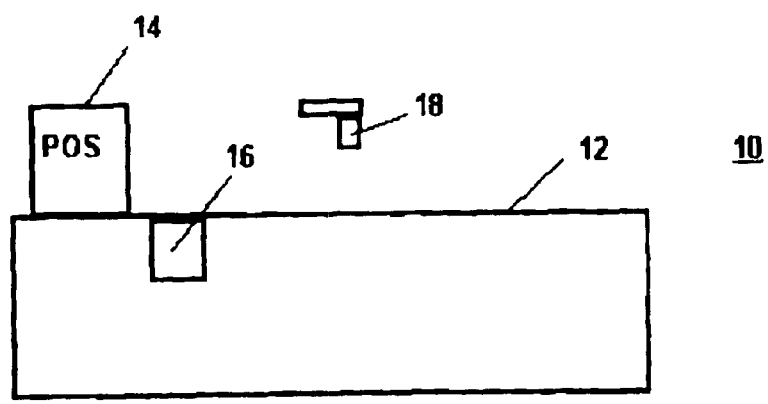
FIG. 1 is a simplified view of an exemplary point of sale system in accordance with an embodiment of the present invention.

FIG. 1 is a simplified illustration of a point of sale system (POS system) 10. System 10 includes a POS terminal 14 to which is connected a bar code scanner 16, which may be mounted on a counter 12. An additional portable scanner 18 is also provided. Scanner 18 is arranged to exchange wireless data communications with the POS terminal 14 to relay data thereto.

Using the arrangement of FIG. 1, a checkout clerk can use either the built-in scanner 16 on the counter 12 to scan the bar code on an item, or alternately use the portable scanner 18 to scan bar codes on an item, such as a bulky item which need not be removed from the shopping cart for the checkout process. When portable scanning device 18 is used, the data representing the bar code is sent by radio data communications to terminal 14. The terminal data communications may be a master/slave data communications protocol, such as the bluetooth protocol, for example.

Figure 2:
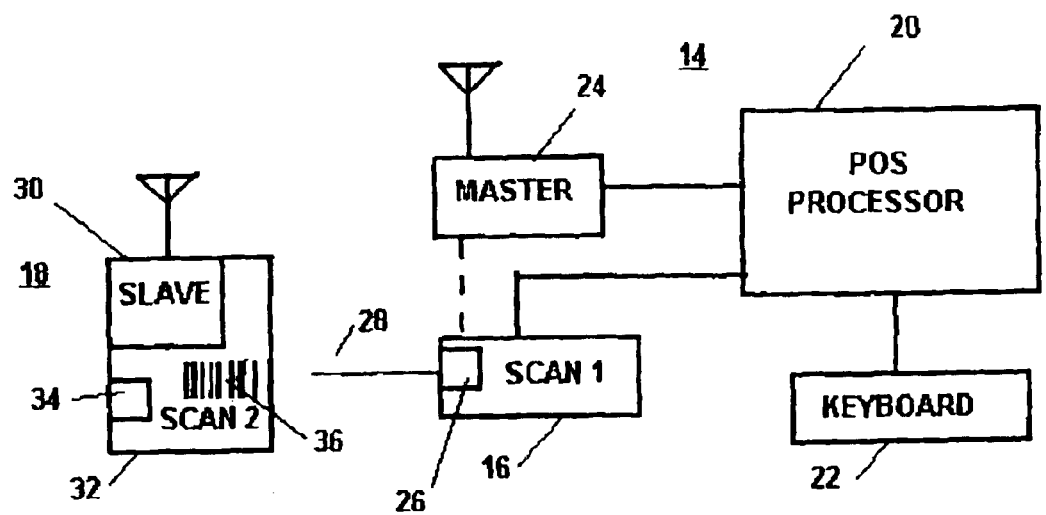
FIG. 2 is a block diagram illustrating the major components of the FIG. 1 system.

Referring to FIG. 2, there is shown a block diagram illustrating the principle components of the POS system 10 of FIG. 1. The portable bar code scanning device 18 includes a slave radio, such a bluetooth radio module 30 and a bar code reading device 34 which is arranged to optically read a bar code on an item. Radio 30 and bar code scanner 34 are enclosed in a housing 32 which includes on the outside thereof a bar code 36. The housing 32 may be of any shape which is appropriate to hold the bar code reading device 34 and the radio 30, such as the shape of a pistol as shown in FIG. 1.

POS system 14 includes a processor 20, which includes a program for performing the functions of a point of sale terminal, and also includes bar code scanner 16 which has an optical scanning device 26 for scanning in a direction indicated by 28. In addition, POS terminal 14 includes a bluetooth or other master radio 24 for conducting wireless data communications with a slave radio.

Those skilled in the art will recognize that terminal 14 will include other peripheral devices, such as keyboard 22, a display not illustrated, and possibly a cash draw or credit card reading device.

According to the present invention, the first scanner 16, which is associated with the processor 20 of the POS terminal, is used to read the bar code 36 on the housing of the second scanner. By so reading the bar code 36, the POS processor 20 acquires the identification of the portable bar code reader 18. Accordingly to one arrangement, for example, bar code 36 can be a bar code representation of the wireless network address of slave radio module 30. In another arrangement, bar code 36 may represent an address in a memory of POS processor 20 wherein the address of slave radio module 30 is stored. By the use of the first scanner 16, to read bar code 36, POS processor 20 determines that a portable scanner is being read and the identification of portable terminal 18 to be used therewith. Processor 20 thereafter operates and configures master radio module 24 to establish itself as a master associated with slave radio module 30 so that slave radio module 30 can conduct radio data communication providing bar code data to the POS processor 20 via the master radio 24.

Once the radio modules 24, 30 have established a master/slave radio link, for example using the bluetooth protocol, the operator of the POS system 10 is enabled to alternately scan items using the fixed scanner 16 in counter 12 or using the portable scanner 18. Accordingly, the system of the invention provides a fast and convenient way to establish a communications link between the portable scanner 18 and the POS terminal 14, which may be necessary, for example, when a portable scanner 18 is brought to a terminal upon opening of a register or when a portable terminal 18 has to be returned to a charger for charging and another terminal 18 is to be used with a particular POS system 10. It will be recognized that the portable item may be another wireless data device, such as a wireless LAN telephone or other accessory to be used in connection with terminal 14.

In accordance with another aspect of the invention, the bar code 36 can also be used to disassociate slave radio 30 from master radio module 24. In this case, a second scanning of bar code 36 by the scanner 16 can be a control mechanism to discontinue the master/slave relationship. Alternately, the master/slave relationship can be terminated by operating keyboard 22 to discontinue association of the master device with whatever slave device 30 it has established association with.

While there have been described what are believed to be the preferred embodiments of the present invention, those skilled in the art will recognize that other changes and modifications may be made thereto without departing from the spirit of the invention and it is intended to claim all such changes and modifications as for within the true scope of the invention.

We claim:

1. In a point of sale system for acquiring bar code data relating to a transaction, wherein a first bar code scanner is arranged to scan bar codes and provide data relating to scanned bar codes to a processor, the improvement comprising a second portable bar code scanner, said second scanner including a slave radio module for acting as a slave unit using a master-slave data communication protocol and said second scanner including an identifying bar code individually identifying said second scanner, and wherein there is provided a master radio module associated with said point of sale system and wherein said master radio module is arranged to act as a master for communication with said slave radio module in response to reading of said identifying bar code on said second scanner by said first bar code scanner.

2. The improvement specified in claim 1 wherein said identifying bar code is representative of a data communication address for said slave radio.

3. The improvement specified in claim 1 wherein said processor includes a memory having a data communication address for said slave radio associated with data representing said identifying bar code.

4. The improvement specified in clam 1 wherein said master radio module is arranged to discontinue acting as a master for communication with said slave radio module in response to a further reading of said identifying bar code.

5. A method for establishing a master/slave data communication link between a master device having a first bar code scanner and a slave device comprising a portable bar code scanner, comprising the steps of:

providing an identifying bar code on the exterior of said portable bar code scanner, said identification device including identification data individually identifying said slave device;

reading said identification device with a reader, other than said slave device, associated with said master unit to obtain said identification data;

determining a slave address of said slave device from said identification data and operating said master unit to associate with said slave device using said slave address.

6. The method of claim 5, further comprising the step of providing the identifying bar code on the exterior of said portable bar code scanner being associated with a network address of the slave device.

7. The method of claim 5, further comprising the step of providing a terminal including a processor, a master radio module for providing data communications and a program for operating said processor, said program being arranged to operate said first barcode scanner, provide data to said processor, operate said processor to recognize said data as data identifying said slave device, and operate said master radio module to conduct data communication with said slave device.

8. A method for reading bar codes on items to be purchased, comprising:

providing a portable bar code reader having a slave radio module having a slave address for providing data communication and an identifying bar code on said reader;

reading said identifying bar code with a second bar code reader associated with a master radio module and a data processor to obtain identifying data;

determining said slave address using said identifying data;

operating said master unit to associate with said slave unit; and using selectively said portable bar code reader and said second bar code reader to read bar codes and provide data to said processor.

* * * * *